United States Patent [19]

Jones

[11] Patent Number: 5,377,647

[45] Date of Patent: Jan. 3, 1995

[54] FUEL BLENDING SYSTEM FOR HIGHLY COMPRESSED GASES

[76] Inventor: James M. Jones, 413 W. Jefferson, Waxahachie, Tex. 75165

[21] Appl. No.: 142,814

[22] Filed: Oct. 25, 1993

[51] Int. Cl.⁶ .......................................... F02M 21/04
[52] U.S. Cl. ........................................ 123/527; 48/184
[58] Field of Search .................. 123/525, 527; 48/144, 48/184

[56] References Cited

U.S. PATENT DOCUMENTS

| | | | |
|---|---|---|---|
| 2,767,691 | 10/1956 | Mengelkamp et al. | 123/1 A |
| 3,780,718 | 12/1973 | Nambu et al. | 123/179.16 |
| 4,413,607 | 11/1983 | Batchelor et al. | 123/527 |
| 4,421,087 | 12/1983 | Schuurman | 123/445 |
| 4,430,978 | 2/1984 | Lewis et al. | 123/478 |
| 4,434,774 | 3/1984 | Horiuchi | 48/184 |
| 4,503,831 | 3/1985 | Rijkeboer | 123/525 |
| 4,503,832 | 3/1985 | Pefley et al. | 123/527 |
| 4,520,766 | 6/1985 | Akeroyd | 123/27 GE |
| 4,526,155 | 7/1985 | Van der Wildenburg et al. | 48/184 |
| 4,576,132 | 3/1986 | Nakajima et al. | 123/438 |
| 4,579,097 | 4/1986 | Yamamoto et al. | 123/438 |
| 4,686,951 | 8/1987 | Snyder | 123/527 |
| 4,813,394 | 3/1989 | St. Clair | 123/527 |
| 4,867,127 | 9/1989 | Quirchmayr et al. | 123/527 |
| 5,033,444 | 7/1991 | Kaufman et al. | 123/527 |
| 5,076,244 | 12/1991 | Donaldson | 123/527 |
| 5,076,245 | 12/1991 | Jones | 123/527 |
| 5,101,799 | 4/1992 | Davis et al. | 123/527 |
| 5,117,798 | 6/1992 | Nozaki | 123/527 |
| 5,126,079 | 7/1992 | Nagamatsu | 261/44.7 |
| 5,136,986 | 8/1992 | Jenson | 123/27 GE |
| 5,146,903 | 9/1992 | Bauerstock | 123/527 |
| 5,150,685 | 9/1992 | Porter et al. | 123/478 |
| 5,150,690 | 9/1992 | Carter et al. | 123/527 |
| 5,190,216 | 3/1993 | Deneke | 239/5 |

FOREIGN PATENT DOCUMENTS 847752 9/1960 United Kingdom ................ 48/184

OTHER PUBLICATIONS

ImpCO Carburetion Inc. Pamphlet-pp. 1–12 Propane Fuel Management System, Jan. 1987.

Primary Examiner—Willis R. Wolfe
Assistant Examiner—Erick Solis
Attorney, Agent, or Firm—Johnson & Wortley

[57] ABSTRACT

An improved mechanical air-fuel blending system for use with internal combustion engines, in which a highly compressed fuel such as Liquified Petroleum (LP), is throttled at its storage pressure across a single fuel valve before entering a fuel flow divider which allows the main portion of the discharged LP to flow directly into the air stream before passing to the internal combustion engine. A small portion of the discharged fuel, termed the control fuel, is separated within a fuel flow divider and is diverted across one or more heat exchangers, where it transfers heat to and from the incoming air charge which brings the temperature of the control fuel to that of the incoming air, before entering the air stream at the venturi across one or more orifices. The control fuel pressure within the heat exchanger is compared with the free air pressure entering the system, across a light diaphragm to control the positioning of a fuel valve.

23 Claims, 2 Drawing Sheets

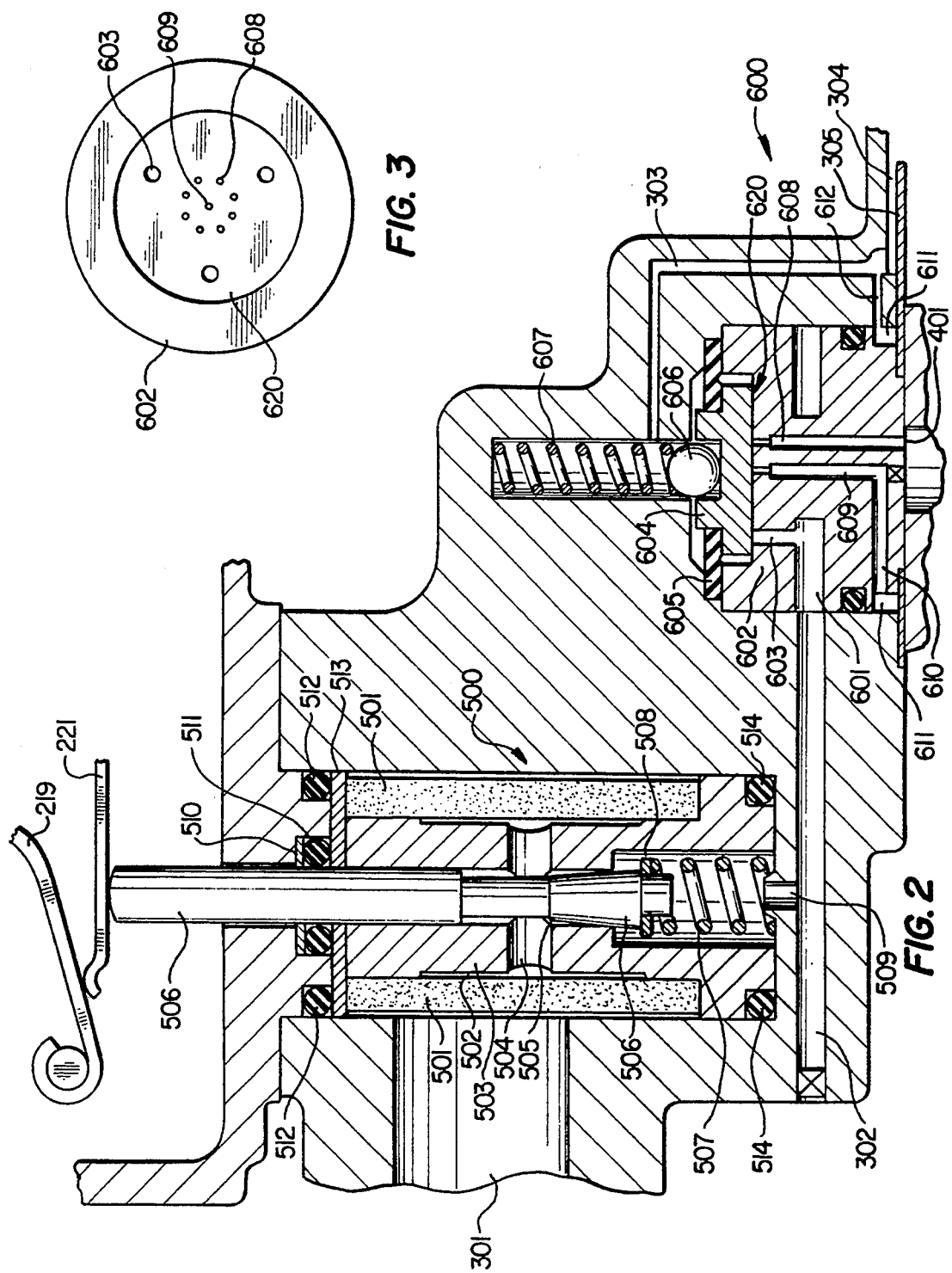

1

FUEL BLENDING SYSTEM FOR HIGHLY COMPRESSED GASES

BACKGROUND OF THE INVENTION

1. Field of the Invention

This invention relates to mechanical air-fuel blending systems for highly compressed gases, such as Liquified Petroleum (LP) and, more particularly, to mechanical air-fuel system which utilizes a portion of the compressed gaseous fuel charge in its gaseous state as a control means to balance the fuel mass to the air mass in an internal combustion engine.

2. History of the Prior Art

A conventional Liquified Petroleum (LP) fuel system in use today for internal combustion engines is illustrated in U.S. Pat. No. 4,503,831 to Rijkeboer. The apparatus in Rijkeboer stores the LP gas in a liquid phase in a tank which has a working pressure of approximately 265 psig. In operation, the fuel leaves the tank and passes through a filter and a vacuum-controlled safety shutoff valve which stops the fuel flow whenever the engine is stopped.

During engine start, the fuel enters a converter, which is a two-stage pressure regulating device which converts the fuel to a gaseous state. The converter is heated with water from the engine's cooling system to supply latent heat to the fuel and to maintain the fuel at a constant temperature. The first stage of the converter reduces the fuel pressure to about 5 psig. The second stage is a demand regulator which reduces the pressure to a partial vacuum of about 1 to 2 inches of water. The fuel then moves through a suitable hose to either an air valve or a venturi adapter where the fuel is blended with the air charge before entering the engine induction system.

In addition to the two or three stage converters described above, it has also been common practice to put a heat riser ahead of the fuel injectors to increase the temperature of the incoming ambient air by about 50° F., so that when the air mixes with the LP gas, the high air temperature ensures that the fuel is in a totally gaseous state when it is injected into the engine cylinders. Thus, past systems which heat the entire fuel flow to a gaseous state, have been very large and complex, and have been difficult to maintain.

Some existing systems, such as that disclosed in U.S. Pat. No. 4,503,832 to Pefley et al., increase available engine power when using a secondary fuel by maintaining the secondary fuel in a liquid state until it reaches the fuel injector. Secondary fuels contain about 30 to 40 percent less latent energy than gasoline or diesel fuel. In the gaseous state, acceptable levels of performance can still be attained at power levels up to about 85 percent of the maximum engine power which is available using gasoline. At power settings above 85 percent, however, very little additional power can be attained from gaseous secondary fuels because the air flow to the engine is restricted. Air flow is critical to engine power generation, and the air flow is restricted at power settings above 85 percent for two reasons. First, because of the reduced energy content of secondary fuels, a greater volume of fuel is required to generate the same amount of energy as gasoline. The greater volume of fuel displaces the air and reduces the power generated. Second, the additional 50° F. of air temperature from the heat riser reduces the density of the air flow which can be allowed. If the heat riser is removed, a vehicle using LP gas can attain a maximum power of approximately 90 percent of that attainable with gasoline.

When LP gas is released from the pressure vessel, it creates an extreme chilling effect as it rapidly expands and returns to a gaseous state. When LP gas is delivered to the injector, such that the total expansion of the fuel takes place within the injector air stream, without a heat riser, the refrigerating effect of the expanding gas lowers the temperature of the air-fuel charge by approximately 80° F. and increases the density of the air-fuel charge by approximately 18 percent. This results in an increase of approximately 63 percent in available power above the design maximum power of the engine. With LP as the fuel, and the total expansion of the LP taking place within the injector airstream, without a heat riser, the air-fuel temperature is lowered by approximately 50° F. This increases the air density by approximately 7 percent, increasing the available engine power above the design maximum power by approximately 45 percent.

Although systems such as Pefley, et al. may achieve the benefits of injecting LP gas in the liquid state, they do so by utilizing complex cooling systems to maintain the LP gas as a liquid until it reaches the inlet air stream. Thus, the increased power is achieved at the expense of increased system complexity and its associated reduced reliability and increased maintenance costs.

It would be a distinct advantage to have a system which is capable of delivering liquid secondary fuels directly into the inlet air stream of an internal combustion engine, and which is small and reliable due to a simple mechanical design. The present invention provides for a very simple and compact fuel system for internal combustion engines which introduces the fuel to the air stream at storage pressures across a single fuel valve. The compact size and the absence of a water heated converter allow for a much simpler, less expensive, and more reliable installation.

SUMMARY OF THE INVENTION

The art of this invention is the art of comparing the mass fuel flow to the mass air flow and then positioning the fuel valve to provide the desired amount of fuel for an internal combustion engine.

The fuel valve is positioned to meet the fuel demand by a fuel diaphragm acting upon a valve lever with the bottom side of the diaphragm having free communication with the engine's intake manifold, and the upper side communicates with the bottom side across a resisting orifice, termed the fuel valve vacuum orifice. A 6–9" $H_2O$ pressure difference is required across the fuel diaphragm to initially open the fuel valve.

Once the fuel valve is opened, the throttled fuel flows to a fuel flow divider which separates the fuel into a main fuel discharge and a control fuel discharge. The main fuel discharge, in its liquid state, exits the control unit and enters the main air stream at the hose adapter. The control fuel discharge is routed to a primary heat exchanger in the control unit, which converts the control fuel to a substantially all vapor state, and passes to a control chamber passage.

A portion of the control fuel passes to a secondary heat exchanger within the hose adapter where heat is exchanged between the control fuel and the air stream passing through the venturi. The control fuel exits the secondary heat exchanger through a max power orifice in the side of the venturi. The area of the power max orifice can be varied using a trim screw.

Another portion of the control fuel from the control fuel passage crosses a control fuel orifice into a chamber above a control diaphragm. Control fuel in the chamber above the control diaphragm is bled across the idle trim to the intake manifold of the internal combustion engine. The bottom side of the control diaphragm is open to free air at ambient, or near ambient, pressure.

Changes in the control fuel are sensed above the control diaphragm which in turn changes the location of the control diaphragm. A decrease in control fuel pressure will raise the control diaphragm, and an increase in control fuel pressure will lower the control diaphragm. Raising the control diaphragm will increase the free air flowing across the control air orifice, and lowering the control diaphragm will decrease the free air flowing through the control air orifice.

Because the bottom side of the fuel diaphragm is open to the intake manifold vacuum, and a resistance orifice connects the bottom side to the top side, increasing the free air flowing across the control air orifice will lower fuel diaphragm and decreasing the free air flowing across the control air orifice will raise the fuel diaphragm due to spring force of a wear beam. Lowering the fuel diaphragm will open the fuel valve and raising the fuel diaphragm will close the fuel valve.

In one aspect, the present invention includes a means for mixing the fuel mass flow with the air mass flow, a means for controlling the fuel mass flow to the means for mixing, a means for separating from the fuel mass flow a control fuel flow, and a means for comparing the control fuel flow with the air mass flow. The means for controlling the fuel mass flow increases the fuel mass flow when the means for comparing the control fuel flow with the air mass flow indicates that the control fuel flow has decreased compared to the air mass flow. The means for controlling the fuel mass flow decreases the amount of fuel mass flow to the means for mixing when the means for comparing the control fuel flow with the air mass flow indicates an increase in the amount of control fuel flow compared to the mass air flow. In this manner the air fuel blending system balances the fuel mass flow and air mass flow to the internal combustion engine based on a comparison of a control fuel flow, separated from the fuel mass flow, with the air mass flow to the internal combustion engine.

In a further aspect, the present invention includes a venturi having a reduced diameter, or throat, that the air mass flow passes through prior to reaching the internal combustion engine.

In yet a further aspect of the present invention, the means for comparing the control fuel flow with the air mass flow is a control fuel passage which receives the control fuel flow and is in flow communication with the reduced diameter of the venturi. Pressure within the control fuel passage is dependent upon the amount of control fuel flow injected into the pass age, and the loss of pressure through the flow communication with the reduced diameter of the venturi. As the ratio of control fuel flow to air mass flow increases, the pressure within the control fuel passage also increases. As the ratio of control fuel flow to air mass flow decreases, the pressure within the control fuel passage also decreases. In this aspect of the present invention, the means for controlling the fuel mass flow decreases the fuel mass flow as the pressure within the control fuel passage increases, and increases the fuel mass flow as the pressure within the control fuel passage decreases. In this manner, the air-fuel blending system controls the fuel mass flow ratio to the air mass flow which is received by the internal combustion engine.

In yet a further aspect of the present invention, the means for comparing the control fuel flow with the air mass flow includes a comparison control chamber having an upper comparison control chamber and a lower comparison control chamber separated by a comparison control diaphragm. The upper comparison control chamber is in flow communication with the control fuel passage, and the lower comparison control chamber is in flow communication with a free air source having a substantially constant pressure. The comparison control chamber is designed such that as the pressure in the control fuel passage increases, the pressure within the upper comparison control chamber also increases, causing the comparison control diaphragm to move towards the lower comparison control chamber. A decrease in pressure within the control fuel passage will result in a lower pressure within the upper comparison control chamber, causing the comparison control diaphragm to move toward the upper comparison control chamber. In this manner, the means for comparing control fuel flow with air mass flow represents that comparison by movement of the comparison control diaphragm. In this aspect of the invention, the means for controlling the fuel mass flow decreases the fuel mass flow as the comparison control diaphragm moves toward the lower comparison control chamber, and increases the fuel mass flow as the comparison control diaphragm moves toward the upper comparison control chamber.

In yet a further aspect of the present invention, the means for controlling the fuel mass flow comprises a fuel control chamber having an upper fuel control chamber and a lower fuel control chamber separated by a fuel control diaphragm, a fuel control chamber passageway in flow communication with the upper fuel control chamber and the lower fuel control chamber, a control valve orifice placing the upper fuel control chamber in flow communication with the lower comparison control chamber, and a spring means forcing the fuel control diaphragm towards the upper fuel control chamber. In this aspect of the present invention, the control valve orifice is positioned so that free air from the lower comparison control chamber diaphragm is increasingly allowed to flow from the lower comparison control chamber diaphragm into the upper fuel control chamber as the comparison control diaphragm moves toward the upper comparison control chamber, and, restricts the free air flowing from the lower comparison control chamber into the upper fuel control chamber as the comparison control diaphragm moves toward the lower comparison control chamber. The fuel control chamber passageway places the upper fuel control chamber in flow communication with the lower fuel control chamber, and has a passageway orifice which restricts the flow between the two chambers. The lower fuel control chamber is also in flow communication with the intake manifold of the internal combustion engine, thereby reducing the pressure within the lower fuel control chamber. Also in this aspect of the present invention, a valve is connected to the fuel control diaphragm which increases the fuel mass flow as the fuel control diaphragm moves towards the lower fuel control chamber, and decreases the fuel mass flow as the fuel control diaphragm moves towards the upper fuel control chamber. In this manner, as the ratio of control fuel flow to air mass flow decreases the pressure within the control fuel passage decreases, causing the comparison control diaphragm to move towards the upper comparison control chamber, thereby allowing free air into the upper fuel control chamber, resulting in a downward movement of the fuel control diaphragm, which increases the fuel mass flow through the valve. Likewise, as the ratio of control fuel flow to air mass flow increases, the pressure within the control fuel passage increases causing the comparison control diaphragm to move towards the lower comparison control chamber, thereby restricting the flow of free air flow into the upper fuel control chamber, causing the fuel control diaphragm to move towards the upper fuel control chamber, which results in the valve decreasing the fuel mass flow to the mixing means. In this manner, the ratio of fuel mass flow to air mass flow for the internal combustion chamber is controlled.

In yet a further aspect of the present invention, an adjustable pressure bleed valve, such as a power max trim screw, adjusts the area exposed to the throat of the venturi, thereby restricting the flow communication between the control fuel passage and the venturi. In this manner, adjustments can be made for the fuel ratio requirements of individual size and types of internal combustion engines.

In yet a further aspect, the present invention includes a means for transferring heat between the air mass flow passing through the throat of the venturi, and the control fuel flow within the control fuel passage.

In yet a further aspect, the present invention includes a means for transferring heat between the internal combustion engine and the control fuel flow, prior to the control fuel flow entering the control fuel passage. In this manner, the control fuel entering the control fuel passage is substantially all in a vapor phase.

In yet a further aspect of the present invention, the control fuel passage, or the upper comparison control chamber, is in flow communication with the intake manifold of the internal combustion engine. In yet even a further aspect, an adjustable control bleed valve, such as an idle trim screw, restricts the flow from the control fuel passage, or the upper comparison control chamber, to the intake manifold. In this manner, the air fuel mixture at various settings can be adjusted and fuel for idling can be passed to the internal combustion engine without having to pass through the means for mixing and other control aspects of the present invention.

BRIEF DESCRIPTION OF THE DRAWINGS

FIG. 2 is a front-side, elevational, partial sectional view of a control section illustrating a fuel valve and a fuel flow divider; and FIG. 3 is a top view of the fuel flow divider spool of the present invention.

DETAILED DESCRIPTION

Figure 1:
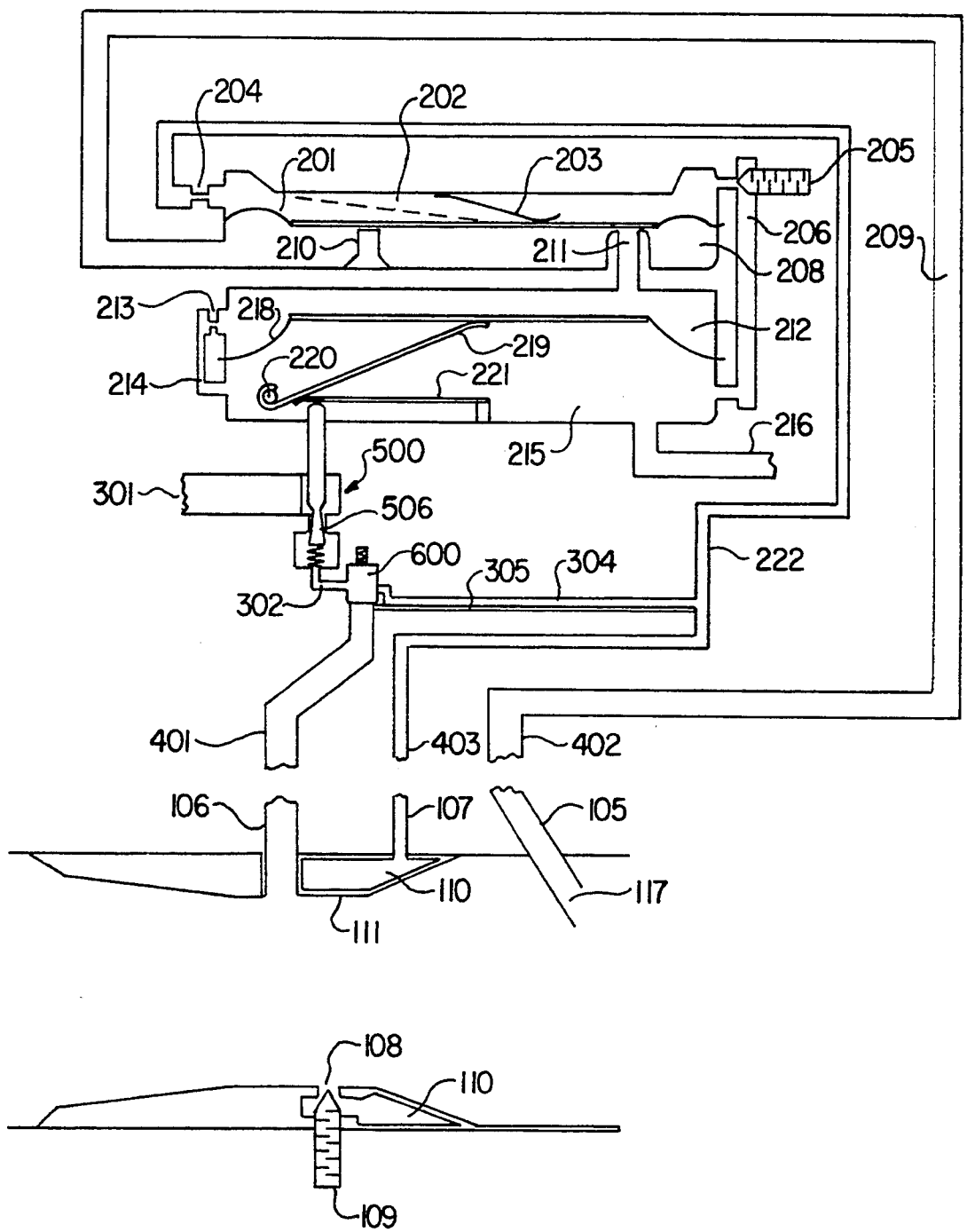
FIG. 1 is a schematic diagram illustrating the flow of air and fuel during the operation of the preferred embodiment of the system of the present invention.

Referring first to FIG. 1, there is shown a schematic diagram illustrating the flow of air and fuel during the operation of the preferred embodiment of the system of the present invention. The present invention is a mechanical fuel blending system comprised of a control unit and a hose adapter unit. The system compares the mass fuel flow to the mass air flow and then adjusts a fuel valve 500 to provide the desired amount of fuel. At starting, the engine's intake manifold vacuum will open a standard vacuum operated safety valve (not shown) to allow the flow of liquid fuel to a fuel inlet 301. The fuel valve 500 will not open until there is a pressure difference across a fuel valve diaphragm 218. Free air, at ambient or near ambient pressure, is provided through a free air pitot tube 117 and is routed through a hose connector 105 and then through a suitable hose to a hose connection 402 of the control unit. The free air then flows through a free air passage 209 and into a lower control diaphragm chamber 208. A manifold vacuum source connection 216 connects to the engine's intake manifold and provides the pressure differential across a control diaphragm 201 necessary to tilt the control diaphragm 201. The control diaphragm 201 remains in contact with the outer edge of a control air orifice 211 and tilts upward from a diaphragm post 210 due to the action of a light balance spring 203. When the control diaphragm 201 tilts, free air is allowed to pass through the control air orifice 211 and into an upper fuel diaphragm chamber 212.

Still referring to FIG. 1, the manifold vacuum source connection 216 connects to a lower fuel diaphragm chamber 215. The lower fuel diaphragm chamber 215 communicates with the upper fuel diaphragm chamber 212 through a fuel valve orifice 213 and a passage 214. Pressure in the lower fuel diaphragm chamber 215 will be less than the pressure in the upper fuel valve diaphragm chamber 212 due to the manifold vacuum source connection 216 with the lower fuel diaphragm chamber 215 and the resistance of the fuel valve orifice 213. The greater pressure in the upper fuel diaphragm chamber 212 acts downward upon a fuel valve diaphragm 218, a diaphragm lever 219, a wear beam 221, and the fuel valve 500. The pressure difference across the fuel valve diaphragm 218 required to initially open the fuel valve 500 is approximately 6–9" $H_2O$.

Referring now to FIG. 2, there is illustrated the flow of liquid fuel across a fuel valve 500 and a fuel flow divider assembly 600. The fuel enters the fuel valve 500 at a fuel inlet 301. Fuel in the fuel valve 500 crosses a filter 501 and enters a wide groove 502 of a valve housing 503, before passing through a cross hole 504 and into a center bore 505 of the valve housing 503. Upper and lower housing seals 512 and 514 seal the valve housing 503 at each end, and an inner seal washer 513 provides a sealing surface for the valve housing 503. A fuel valve stem 506 fits into the center bore 505 and is closed by a valve spring 507 which rides against a spring guide 508. A stem seal washer 510 receives a valve stem seal 511. When the fuel valve stem 506 is opened, fuel flows from the center bore 505 past the fuel valve stem 506, exits at a fuel outlet 509, and enters a passage 302.

Still referring to FIG. 2, the liquid fuel flows through the passage 302 to the fuel flow divider assembly 600. The ratio of air mass to fuel mass depends upon the division of fuel flow divider assembly 600. In the fuel flow divider assembly 600, the liquid fuel enters a groove 601 of a divider spool 602 before entering three fuel feed ports 603. The fuel feed ports 603 exit the divider spool 602 through a spool top surface 620 (see FIG. 3). Disposed above the spool top surface 620 is a modulator plate 604. The modulator plate 604 is bonded to a diaphragm 605 with a lift that is limited to 0.005" before contacting the end of the housing bore. A spring 607 rides on a ball bearing 606 and forces the modulator plate 604 downward toward the spool top surface of the flow divider spool 602. When there is no fuel flowing through the fuel inlet 301, the smooth flat surface of the modular plate 604 contacts the smooth flat surface of the spool top surface 620.

Referring still to FIG. 2, when fuel flows up the fuel feed ports 603 the fuel presses against the modulator plate 604. When the fuel flowing up the fuel feed ports 603 and contacting the modular plate 604 reaches a pressure of approximately 6-9 psig, the modulator plate begins to lift and positions itself to the proper distance from the spool top surface 620. Passage 303 provides for venting of the area above the modulator plate 604 and diaphragm 605. The fuel exits the area between the spool top surface 620 and the modulator plate 604 through eight main fuel discharge ports 608 and a control fuel discharge port 609 in the spool top surface 620 (see FIG. 3). The fuel discharged to the main fuel discharge ports 608 exits through a main fuel discharge passage 401 and is routed to a hose connection 106 where the discharged liquid fuel enters, and mixes with, the incoming air stream. Although the preferred embodiment illustrates using the venturi to mix the fuel mass flow with the air mass flow, any means of mixing fuel mass flow and air mass flow for use an internal combustion engine can be used. The fuel discharged to, the control fuel discharge port 609 flows into a pass age 610 and pass ms through a groove 611 before entering a primary heat exchanger 304 through passage 612. The size and location of the main fuel discharge ports 608, size and location of the control fuel discharge port 609, and spring 607 are selected to provide an optimum division of fuel flow for use as discharge fuel and control fuel.

Referring back to FIG. 1, fuel entering the primary heat exchanger 304 is a control fuel and absorbs heat through a primary heat exchanger cover 305. There is substantial heat transfer and the control fuel entering control fuel passage 222 is substantially a dry gas at a temperature very near that of the air temperature of the engine compartment. A portion of control fuel from the control fuel passage 222 exits through a hose connection 403. The control fuel exiting through the hose connection 403 passes through a suitable hose to a hose connection 107. Control fuel from the hose connection 107 enters a secondary heat exchanger 110 where it then exits through a max power orifice 108 to the air steam. The area of the max power orifice 108 can be adjusted by a max power trim screw 109. Smaller engines will require less max power orifice area and the trim screw 109 allows for application flexibility. The max power trim screw 109 can be adjusted to set the engine's fuel requirement at max power. Another portion of the control fuel from passage 222 exits through a control fuel orifice 204 to the upper control diaphragm chamber 202. Fuel leaves the upper control diaphragm chamber 202 through an idle trim 205 into an idle passage 206, and then exits the system through the intake manifold vacuum source connection 216.

Still referring back to FIG. 1, the control means relies upon accepted principles of physics. Bernoulli's Law states that as the speed of a gas increases its pressure decreases, and as the speed decreases the pressure increases. The force which moves air through the throat of a venturi is the pressure of the ambient air. The quantity of this force is measured by the pressure difference between the ambient air and the lower pressure at the venturi throat, and can hie sensed through an opening in its side, such as the max power orifice 108. An engine's air demands can therefore be sensed through an opening in the side of the throat of a venturi.

Still referring back to FIG. 1, pressure changes are sensed across the max power orifice 108 whenever there is a change in the velocity of the air through the venturi 111. An increase in the velocity of air moving through the venturi 111 will cause a drop in the control fuel pressure which flows across the max power orifice 108, and a corresponding drop in the control fuel pressure in the upper control diaphragm chamber 202. The control diaphragm 201 will lift due to the higher pressure of the free air in the lower fuel diaphragm chamber 208 and allow free air to enter the upper fuel diaphragm chamber 212 through the control air orifice 211. The free air entering the upper fuel diaphragm chamber 212 will cause a downward movement of the fuel valve diaphragm 218 due to the pressure difference created by the manifold vacuum source connection 216 and the restriction of the fuel valve orifice 213. As the fuel valve diaphragm 218 moves downward, the diaphragm 1 ever 219 and wear beam 221 press against the fuel valve stem 506, which in turn opens the fuel valve 500 to allow an increase in fuel flow to balance the fuel mass to the air mass.

Still referring back to FIG. 1, a decrease in the velocity of air through the venturi 111 will cause an increase in the control fuel pressure which flows across the power max orifice 108 and a corresponding increase in the control fuel pressure in the upper control diaphragm chamber 202. This increase in control fuel pressure in the upper control diaphragm chamber 202 will cause the control diaphragm 201 to drop and restrict the volume of free air entering the upper fuel valve diaphragm chamber 212 through the control air orifice 211. The reduction of free air entering the upper fuel diaphragm chamber 212 reduces the pressure differential across the fuel valve diaphragm 218. This lower pressure differential across the fuel valve diaphragm 218, and the upward force of the wear beam 221, causes an upward movement of the fuel valve diaphragm 218. As the fuel valve diaphragm 218 moves upward, the diaphragm 1 ever 219 and the wear beam 221 move upward allowing the fuel valve stem 506 to move upward. The upward movement of the fuel valve stem 506 in turn restricts the flow of fuel across the fuel valve 500 to balance the fuel flow to the air flow. The system described continually senses the air demands of the internal combustion engine and balances the fuel mass to the air mass.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. An air-fuel blending system for regulating a fuel mass flow of a highly compressed fuel, said highly compressed fuel being of a type which exists as a gas at ambient conditions, and blending said fuel mass flow with an air mass flow, said blend used by an internal combustion engine and being received by an intake manifold of said internal combustion chamber, comprising:

means for mixing said fuel mass flow with said air mass flow;

means for controlling said fuel mass flow to said means for mixing;

means for separating said fuel mass flow for use as a control fuel flow;

means for comparing said control fuel flow with said mass air flow; and wherein said means for controlling said fuel mass flow increases said fuel mass flow when said means for comparing senses a decrease in said control fuel flow compared to said air mass flow, and decreases said fuel mass flow when said means for comparing senses an increase in said control fuel flow compared to said air mass flow, said fuel mass flow being introduced in liquid form into an air/fuel blending region.

2. The air-fuel blending system as in claim 1, including a venturi having a reduced diameter, said air mass flow passing through said venturi before reaching said intake manifold of said internal combustion engine.

3. The air-fuel blending system as in claim 2, wherein:

said means for comparing comprises a control fuel passage receiving said control fuel flow and being in flow communication with said reduced diameter of said venturi, wherein pressure within said control fuel passage increases as said control fuel flow increases compared to air mass flow, and decreases as said control fuel flow decreases compared to said air mass flow; and said means for controlling decreases said fuel mass flow as the pressure within said control fuel passage increases, and increases said fuel mass flow as the pressure within said control fuel passage decreases.

4. The air-fuel blending system as in claim 3, including an adjustable pressure bleed valve restricting the flow communication between said control fuel passage and said venturi.

5. The air fuel blending system as in claim 3, including a means for transferring heat between said mass air flow passing through said venturi and said control fuel flow within said control fuel passage.

6. The air-fuel blending system as in claim 3, including a means for transferring heat from said internal combustion engine to said control fuel before said control fuel enters said control fuel passage, wherein said means for transferring heat to said control fuel transfers sufficient heat to cause said control fuel to be substantially in a vapor phase.

7. The air-fuel blending system as in claim 3, wherein said control fuel passage is in flow communication with said intake manifold of said internal combustion engine.

8. The air-fuel blending system as in claim 7, including an adjustable control bleed valve that restricts the flow communication between said control fuel passage and said intake manifold.

9. The air-fuel blending system as in claim 3, including:

an adjustable pressure bleed valve restricting the flow communication between said control fuel passage and said venturi;

a means for transferring heat between said mass air flow passing through said venturi and said control fuel flow within said control fuel passage;

a means for transferring heat from said internal combustion engine to said control fuel before said control fuel enters said control fuel passage, wherein said means for transferring heat to said control fuel transfers sufficient heat to cause said control fuel to be substantially in a vapor phase; and wherein said control fuel passage is in flow communication with said intake manifold of said internal combustion engine, and an adjustable control bleed valve that restricts the flow communication between said control fuel passage and said intake manifold.

10. The air-fuel blending system as in claim 3, wherein:

said means for comparing includes a comparison control chamber having an upper comparison control chamber and a lower comparison control chamber separated by a comparison control diaphragm, said upper comparison control chamber in flow communication with said control fuel passage and said lower comparison control chamber in flow communication with free air having a substantially constant pressure, said comparison control diaphragm moving towards said upper comparison control chamber as the pressure in said control fuel passage decreases and moving towards said lower comparison control chamber as the pressure in said control fuel passage increase; and said means for controlling decreases said fuel mass flow as said comparison control diaphragm moves towards said lower comparison control chamber, and increases said fuel mass flow as said comparison control diaphragm moves towards said upper comparison control chamber.

11. The air-fuel blending system as in claim 10, including an adjustable pressure bleed valve restricting the flow communication between said control fuel passage and said venturi.

12. The air-fuel blending system as in claim 10, including a means for transferring heat between said mass air flow passing through said venturi and said control fuel flow within said control fuel passage.

13. The air-fuel blending system as in claim 10, including a means for transferring heat from said internal combustion engine to said control fuel before said control fuel enters said control fuel passage, wherein said means for transferring heat to said control fuel transfers sufficient heat to cause said control fuel to be substantially in a vapor phase.

14. The air-fuel blending system as in claim 10, wherein said upper comparison control chamber is in flow communication with said intake manifold of said internal combustion engine.

15. The air-fuel blending system as in claim 14, including an adjustable control bleed valve that restricts the flow communication between said upper comparison control chamber and said intake manifold.

16. The air-fuel blending system as in claim 10, including:

an adjustable pressure bleed valve restricting the flow communication between said control fuel passage and said venturi;

a means for transferring heat between said mass air flow passing through said venturi and said control fuel flow within said control fuel passage;

a means for transferring heat from said internal combustion engine to said control fuel before said control fuel enters said control fuel passage, wherein said means for transferring heat to said control fuel transfers sufficient heat to cause said control fuel to be substantially in a vapor phase; and wherein said upper comparison control chamber is in flow communication with said intake manifold of said internal combustion engine, and an adjustable control bleed valve that restricts the flow communication between said upper comparison control chamber and said intake manifold.

17. The air-fuel blending system as in claim 10, wherein said means for controlling comprises:

a fuel control chamber having an upper fuel control chamber and a lower fuel control chamber separated by a fuel control diaphragm, a fuel control chamber passageway in flow communication with said upper fuel control chamber and said lower fuel control chamber, a control valve orifice placing said upper fuel control chamber in flow communication with said lower comparison control chamber, and a spring means forcing said fuel control diaphragm towards said upper fuel control chamber, wherein:

said control valve orifice being positioned so that said comparison control chamber diaphragm increases the restriction of flow of free air through said control valve orifice as said comparison control diaphragm moves toward said lower comparison control chamber, and decreases the restriction of flow of free air through said control valve orifice as said comparison control diaphragm moves toward said upper comparison control chamber;

said fuel control chamber passageway having a passageway orifice which restricts the flow communication between said upper fuel control chamber and said lower fuel control chamber;

said lower fuel control chamber being in flow communication with said intake manifold of said internal combustion engine, thereby reducing the pressure of said lower fuel control chamber;

a valve connected to said fuel control diaphragm and controlling said fuel mass flow, said valve increasing said fuel mass flow as said fuel control diaphragm moves toward said lower fuel control chamber and decreasing said fuel mass flow as said fuel control diaphragm moves towards said upper fuel control chamber.

18. The air-fuel blending system as in claim 17, including an adjustable pressure bleed valve restricting the flow communication between said control fuel passage and said venturi.

19. The air-fuel blending system as in claim 17, including a means for transferring heat between said mass air flow passing through said venturi and said control fuel flow within said control fuel passage.

20. The air-fuel blending system as in claim 17, including a means for transferring heat from said internal combustion engine to said control fuel before said control fuel enters said control fuel passage, wherein said means for transferring heat to said control fuel transfers sufficient heat to cause said control fuel to be substantially in a vapor phase.

21. The air-fuel blending system as in claim 17, wherein said upper comparison control chamber is in flow communication with said intake manifold of said internal combustion engine.

22. The air-fuel blending system as in claim 21, including an adjustable control bleed valve that restricts the flow communication between said upper comparison control chamber and said intake manifold.

23. The air-fuel blending system as in claim 17, including:

an adjustable pressure bleed valve restricting the flow communication between said control fuel passage and said venturi;

a means for transferring heat between said mass air flow passing through said venturi and said control fuel flow within said control fuel passage;

a means for transferring heat from said internal combustion engine to said control fuel before said control fuel enters said control fuel passage, wherein said means for transferring heat to said control fuel transfers sufficient heat to cause said control fuel to be substantially in a vapor phase; and wherein said upper comparison control chamber is in flow communication ,with said intake manifold of said internal combustion engine, and an adjustable control bleed valve that restricts the flow communication between said upper comparison control chamber and said intake manifold.

* * * * *